Figure 1:
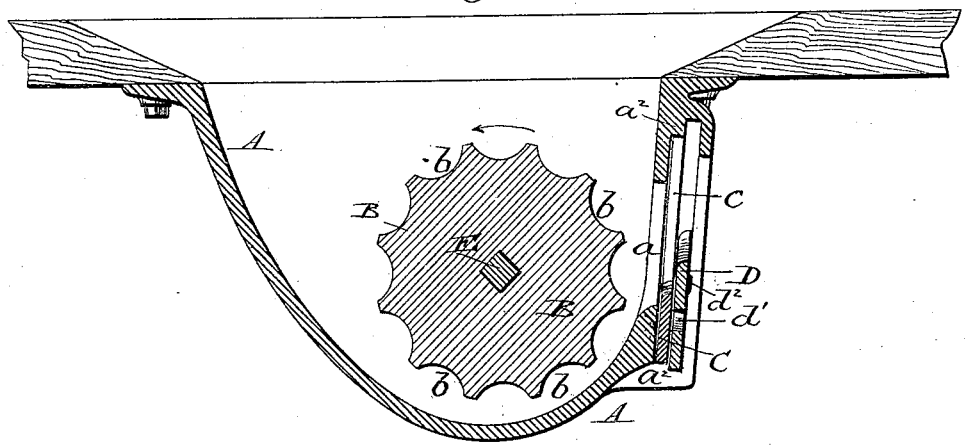

(No Model.) 2 Sheets—Sheet 1.

W. D. ARNETT.
SEEDING MACHINE.

No. 398,112. Patented Feb. 19, 1889.

Attest:
Sidney P. Hollingsworth
N. R. Kennedy

Inventor:
W. D. Arnett.
By his Atty
Phil. T. Dodge (No Model.) 2 Sheets—Sheet 2.

W. D. ARNETT.
SEEDING MACHINE.

No. 398,112. Patented Feb. 19, 1889.

Attest:
Sidney P. Hollingsworth
J. R. Kennedy

Inventor:
W. D. Arnett
By his Atty.
Phil. T. Dodge

UNITED STATES PATENT OFFICE.

WILLIAM D. ARNETT, OF SPRINGFIELD, OHIO.

SEEDING-MACHINE.

SPECIFICATION forming part of Letters Patent No. 398,112, dated February 19, 1889.

Application filed May 19, 1888. Serial No. 274,357. (No model.)

*To all whom it may concern:*

Be it known that I, WILLIAM D. ARNETT, of Springfield, in the county of Clark and State of Ohio, have invented certain Improvements in Seeding-Machines, of which the following is a specification.

My invention has reference to grain-drills in which the seed is delivered by a force-feed mechanism of variable speed to furrows opened by means of disks or equivalent devices carried by drag-bars.

The improvements relate to the construction of the force-feeder, to the variable-speed gearing by which it is driven, and to means for lifting the drag-bars and their furrow-opening devices out of action.

My feeder is of the type in which a horizontal longitudinally-fluted roll acts to deliver the grain through an opening in the rear side of a feed-cup in which the roll is mounted, and in which the rate of feed is regulated in part by a gate which varies the width of the outlet-opening, the feed being also varied to adapt the machine for the distribution of different classes of seeds. In order that these seeders may deliver a continuous and uniform stream of grain, it is necessary that the lower edge of the opening, over which the grain flows in its escape, shall stand at an inclination to the horizon and obliquely across the line of the ribs on the roller, so that at least one rib, and preferably two, shall be feeding with full effect at all times. Were it not for this obliquity the grain would escape from above each rib at the instant that the rib rose to a level with the edge of the opening, and then there would be a momentary cessation until the rib rose clear of the edge to permit the escape of the grain lying below it and above the next rib.

Now the aim of my invention is to provide means for automatically changing the inclination or obliquity of the edge of the opening as the width is varied, so that whether the opening is wide or narrow the edge will lie across the ribs without having at any time too much difference between the heights of its two ends. To this end I employ, in combination with the horizontal movable gate which controls the width of the opening, a vertically-movable plate which forms the lower edge of the opening, and which increases its angle to the horizon as the gate closes, and vice versa.

My improvement in the feed-gear is intended as an improvement on the devices represented in Letters Patent granted to me on the 14th of February, 1887, No. 377,923; and it consists simply in a peculiar manner of forming and supporting the arm which carries the adjustable idler-pinion.

My improvement in the lifting devices consists in combining with the roll on which the lifting-chains are wound a lever and ratchet to effect its rotation, a supporting-pawl to prevent retrograde movement, and device to disengage this pawl, which are carried forward in position to be operated by the foot of the driver.

Figure 2:
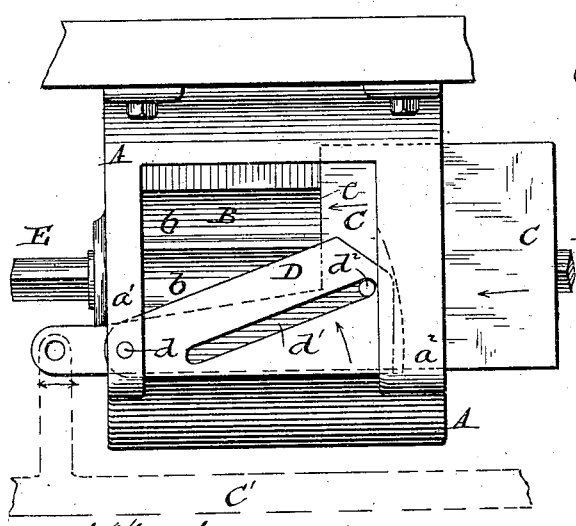
Figure 3:
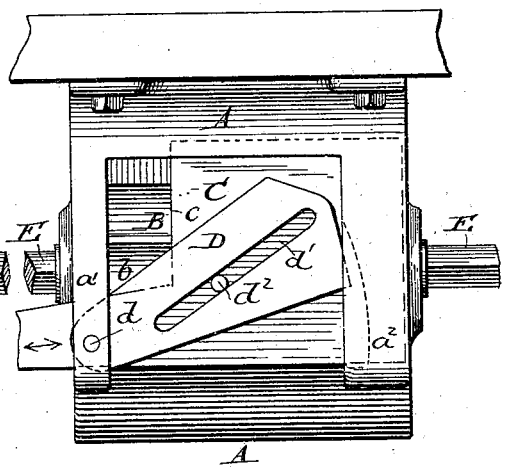
Figure 4:
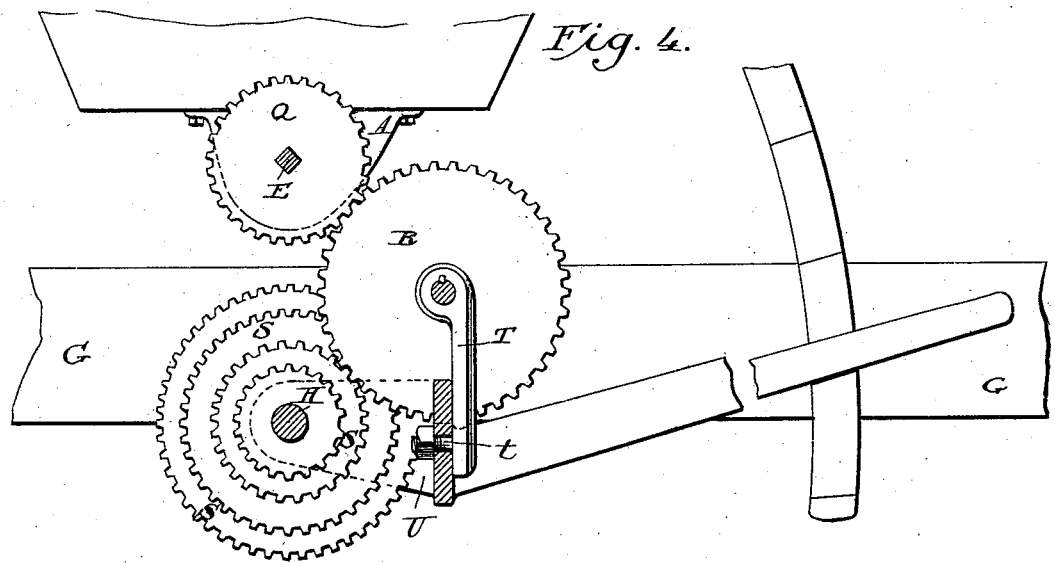
Figures 5, 6:
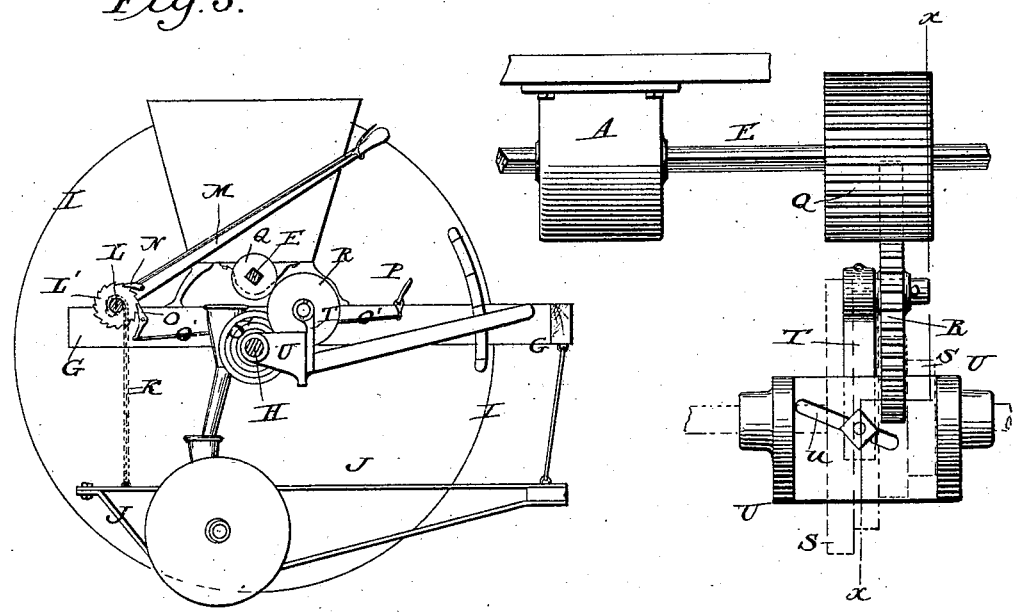

In the accompanying drawings, Figure 1 is a transverse vertical section through a feeder having my improvement applied thereto. Fig. 2 is a rear elevation of the same. Fig. 3 is a diagram illustrating the gates adjusted to positions different from that in Fig. 2. Fig. 4 is a cross-section on the line $x\ x$ of Fig. 6, showing the changed gear. Fig. 5 is a side elevation, partly in section, of a seeder with my improved lifting device applied thereto. Fig. 6 is an end view of Fig. 4, looking in the direction of the arrow.

Referring to the drawings, A represents a feed cup or hopper of ordinary form, open at the top that it may be applied to the under side of the grain-box, and provided at its rear side with an opening, $a$, through which the grain is delivered.

B represents the horizontal feed-roll mounted in the lower part of the feed-cup, and sustained therein by journals or otherwise, that it may revolve around its horizontal axis. This roll is arranged to revolve in close proximity to the lower and rear inner surfaces of the cup, and is formed with longitudinal ribs, flutes, or corrugations $b$, all in the ordinary manner. When in action, the roll revolves in the direction indicated by the arrow, and lifting the grain from the bottom of the cup carries it forcibly upward and delivers it in a continuous stream through the opening $a$, as usual.

C represents a horizontally-movable gate arranged to slide through suitable guides, $a'$ $a^2$, on the rear side of the cup and presenting a vertical edge, c, which extends across and serves as one edge or wall of the outlet-opening, so that as the gate is moved horizontally in the direction indicated by the arrow it will cover the feed-opening, reduce its width, and thereby diminish the rate of delivery.

D represents a second gate located at the rear side of the cup, and mounted at one end on a pivot, d, so that it may swing upward and downward, its upper edge lying across and forming the lower wall of the delivery-opening. This pivoted gate is provided with an oblique slot, d', through which a stud, d², on the gate C projects, as shown. As a result of this arrangement, the movement of the gate C in the proper direction to diminish the width of the feed-opening causes its stud d to swing the gate D upward, so that its upper edge gives to the lower side of the delivery-orifice an increasing inclination from the horizontal. As the gate C recedes to increase the width of the opening, the gate D falls and the inclination or obliquity of the lower edge of the opening is diminished.

The construction and arrangement of the parts are such that under every adjustment, and whether the feed-opening is for the time being of large or of small size, the lower edge of the feed-opening will lie obliquely across one or more of the feed-rolls, so that the grain may be at every instant of time delivered from above and also from beneath the rib which is at the moment rising above the delivery-edge.

The manner of supporting and guiding the gate C and the connection between the gates C and D may be modified within the range of mechanical skill at will, provided only the laterally-moving and vertically-moving gates co-operate, so that the lower edge of the feed-opening is given an increased inclination as its width is diminished, and vice versa.

It is of course to be understood that in applying my device in practice there will be a series of the feeders arranged side by side beneath the hopper and driven by a common shaft, E, in the ordinary manner, and that the series of gates C may be coupled together by a rod, C', or equivalent connection, to effect their simultaneous and equal adjustment.

In machines of the present type with furrow-opening disks the weight of the drag-bars is very great, much greater than in machines of other types, and it is therefore necessary to provide improved means for lifting the drag-bars in order to relieve the driver from the excessive labor which he would otherwise be required to perform. To this end I have devised the arrangement described below, in which a hand-lever is so applied that when given short vibrations it will lift the drag-bars step by step. A locking device at the rear to hold the drag-bars as they rise is combined with a foot-lever at the front of the machine, so that the driver operating the lever with one hand and managing his team with the other may with his foot release the parts when the drag-bars are to be lowered.

The machine is constructed, as usual, with a frame, G, carried by a rotary axle, H, mounted in and turned by ground-wheels I at its ends. The drag-bars J are jointed to the frame and provided with furrow-opening and seed-delivering devices, as usual. Each drag-bar is connected by a lifting-chain, K, to a winding-roll, L, extending across the machine. On one end this roll is provided with a ratchet-wheel, L', and with a loose hand-lever, M, having a pawl, N, which engages the wheel and turns the roll as the lever is vibrated. The lever is provided with a thumb-latch and rod of familiar form, as shown, for lifting the pawl out of engagement when the drag-bars are to be lowered.

The pawl O, pivoted to one of the journal-boxes of the roll, or to any other suitable rigid support, engages the ratchet-wheel to prevent retrograde motion as the hand-lever is retracted. This pawl being in position where it cannot be directly operated by the attendant, I extend a rod, O', forward therefrom to a foot-lever, P, or similar device, on the forward part of the frame. The lever swings from an upright to a horizontal position between the end of the usual seed-box and the main wheel, its position and movement being such that the operator may readily apply the necessary power thereto.

When the bars are to be lowered, it is only necessary for the operator to release the dog O and let the hand-lever swing backward, at the same time disengaging the pawl N, if necessary. It will be perceived that by this arrangement the drag-bars may be raised or lowered step by step.

For the purpose of driving the feeder-shaft E, I provide the same with a long spur-pinion, Q, and connect this pinion by an idle-pinion, R, with a cone-gear, S, fixed rigidly on the axle. The idler R is movable laterally, so that it may be engaged by one portion or the other of the cone-gear to change the speed communicated to the feeder in the manner set out in my patent, No. 377,923. Instead, however, of supporting the idle-pinion by the means shown in that patent, I now support it on the side of an arm, T, the lower end of which is provided with a rib, t, arranged to slide laterally in an oblique groove, u, in the U-shaped block or plate U, the arms of which are mounted loosely in the main axle. The obliquity of the groove is such that as the arm and pinion are moved laterally the pinion is brought in proper relation to the respective teeth of the cone-gear. The block U may be provided with a hand-lever or other suitable operating and locking device which forms no part of the present invention.

Having thus described my invention, what I claim is—

1. The feed-roll and the feed-cup having the delivery-opening a, in combination with the gate C, to reduce the width of the opening, and the co-operating gate D, to vary the angle of the lower edge of the opening, substantially as described.

2. In a seeding-machine, the axle and its cone-gear and the feeder-shaft and its cylindrical gear, in combination with the intermediate idle-pinion, R, the slotted block U, loosely mounted on the axle, and the pinion-supporting arm T, connected with the block U by means of the rib and groove, as shown.

3. In a seeding-machine, the main frame whereon the driver rides, as usual, and the drag-bars hinged thereto, in combination with the winding-roll and chains at the rear end of the frame, the ratchet-wheel on said roll, its actuating-pawl, the pawl-carrying hand-lever extended forward in reach of the rider, the locking-dog engaging the ratchet-wheel, the rod extending thence forward, and the foot-lever for operating the rod, located on the forward end of the frame, whereby the driver is enabled to lift the drag-bars by short vibrations of the lever.

In testimony whereof I hereunto set my hand, this 3d day of March, 1888, in the presence of two attesting witnesses.

WILLIAM D. ARNETT.

Witnesses:
 JOHN F. MEALS,
 H. S. SHOWERS.